Feb. 19, 1963 P. E. APPLEBY 3,078,204
METHOD OF AND APPARATUS FOR BUILDING TIRES
Filed Aug. 25, 1959 9 Sheets-Sheet 3

INVENTOR.
PAUL E. APPLEBY
BY
J. B. Holden
ATTORNEY

FIG. 9

INVENTOR.
PAUL E. APPLEBY
BY
J. B. Holden
ATTORNEY

Feb. 19, 1963 P. E. APPLEBY 3,078,204
METHOD OF AND APPARATUS FOR BUILDING TIRES
Filed Aug. 25, 1959 9 Sheets-Sheet 6

INVENTOR.
PAUL E. APPLEBY
BY
J. B. Holden
ATTORNEY

Feb. 19, 1963  P. E. APPLEBY  3,078,204
METHOD OF AND APPARATUS FOR BUILDING TIRES
Filed Aug. 25, 1959  9 Sheets-Sheet 7

INVENTOR.
PAUL E. APPLEBY
BY
J. B. Holden
ATTORNEY

United States Patent Office 3,078,204
Patented Feb. 19, 1963

3,078,204
METHOD OF AND APPARATUS FOR
BUILDING TIRES
Paul E. Appleby, Akron, Ohio, assignor to The Goodyear Tire & Rubber Company, Akron, Ohio, a corporation of Ohio
Filed Aug. 25, 1959, Ser. No. 835,935
13 Claims. (Cl. 156—132)

This invention relates to a method of and apparatus for building tires, and more particularly to improvements to the method of and apparatus for building pneumatic tires by the flat band process.

In building or assembling pneumatic tires by the so-called flat band process, ply material consisting of parallel textile or metallic cords embedded in sheet rubber, is wrapped or placed about a substantially cylindrical outer surface of a drum or building form, and the circumferential marginal edges of the ply material are folded radially inward over the ends of the drum or building form. Circular bead rings are then placed against the in-turned edges of the ply material which are then folded about the bead rings to retain the latter in place.

The principal object of this invention is to provide a generally improved method of manufacturing pneumatic tires, and an apparatus for carrying out such method which is relatively simple in design and construction and produces improved tires at a reduced cost.

A further object of the present invention is to provide automatic means for turning fabric around the bead rings of a tire automatically and simultaneously about the complete circumference thereof while applying an axial tension to the ply endings so that high quality tires can be manufactured economically at high speed.

A still further object of the invention is to provide an improved expandable tire building drum which may be readily adjustable for making different sizes of tires.

Another object of the invention is to provide a tire building machine with an improved means for lapping the end portions of the fabric over the bead rings.

Other objects, use and advantages of the invention will become apparent to those skilled in the art from the following description and claims and from the drawings, in which:

Referring more particularly to the drawings in which like parts are referred to by the same numerals throughout the several views, a tire building drum 1 is mounted for rotation with a rotatable shaft 2 supported in bearings 3 and 4. The bearings 3 and 4 are mounted on the vertically extending frame members 5 and 6 of the machine frame generally referred to by the numeral 7. The drum shaft 2 is rotated in either direction by the power unit including reversible motor 8 and a brake 9 and suitable drive means for connecting the motor to the shaft 2 including a motor pulley 10 connected by a plurality of V-belts 11 to the shaft pulley 12 which is splined to the shaft 2.

Figure 1:
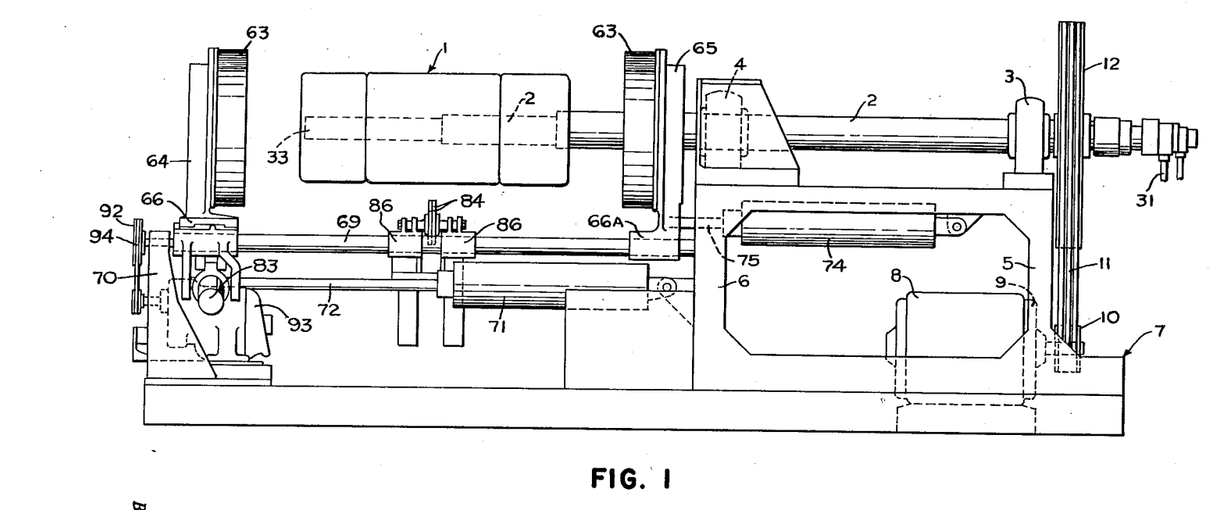
FIG. 1 is a longitudinal elevational view with parts broken away and shown in section illustrating the tire building machine of the present invention.
Figure 2:
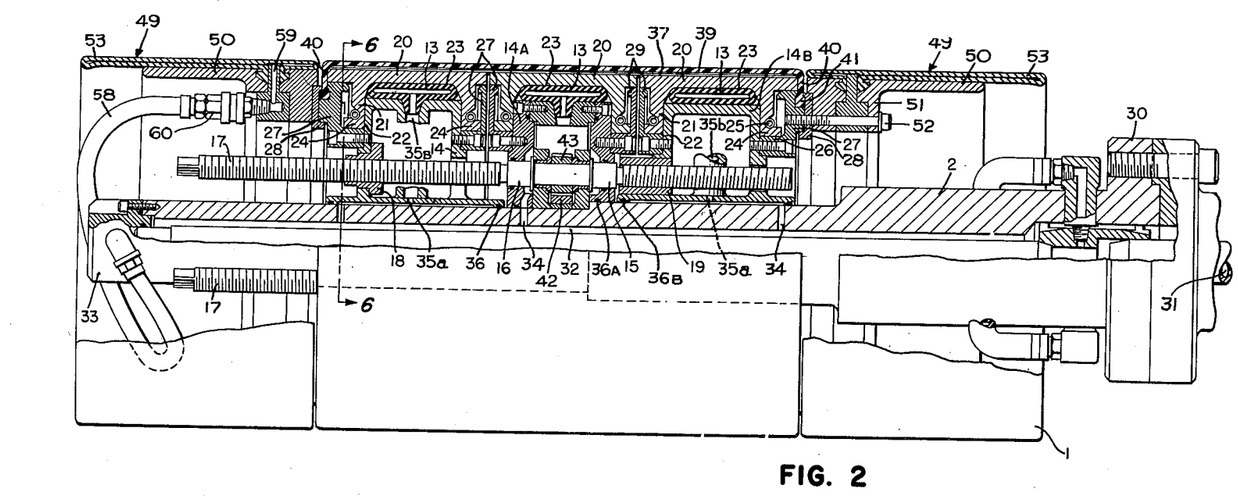
FIG. 2 is a fragmentary longitudinal vertical sectional view of the tire building drum with parts broken away and parts shown in section.
Figure 16:
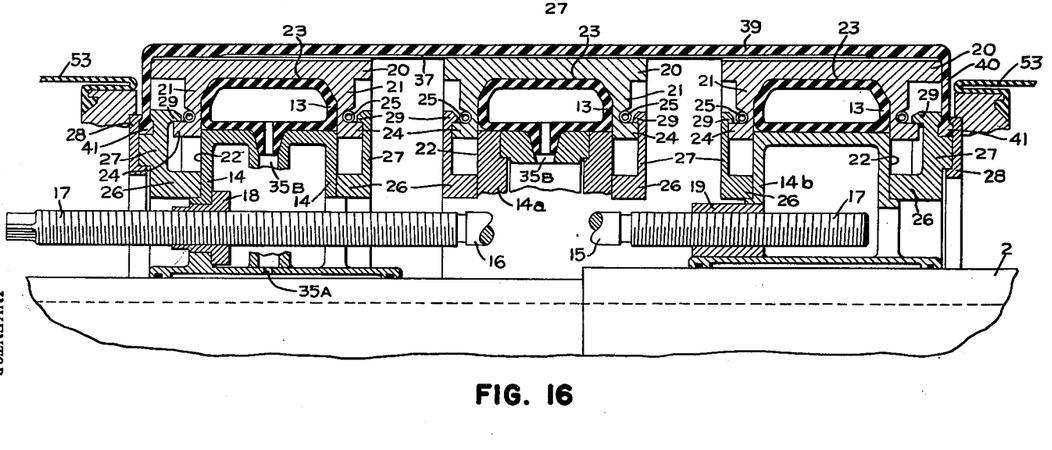
FIG. 16 is an enlarged partial sectional view of the drum similar to FIG. 10 showing the drum in expanded position.

Referring to FIG. 2 of the drawings the drum consists of a plurality of sections, each of which is radially expandable by means of an annular inflatable bladder 13, which are mounted respectively upon a spider 14, 14a or 14b, each of which is secured to the shaft 2. The center spider 14a is fixed to the shaft 2 and the spiders 14 and 14b are axially slidably mounted on the shaft. Spider 14a is provided with journals 15 and 16 which rotatably supports a screw threaded shaft 17, threaded to members 18 and 19 connected to the spider 14 and 14b. Rotation of the shaft 17 will cause the spiders 14 and 14b to move axially relative to the spider 14a. Each of the spiders 14 through 14b supports a plurality of rigid elongated circumferentially narrow elements 20 having depending radially inwardly extending legs 21 which engage the lateral surface 22 of the spiders 14, 14a and 14b. The elements 20 are provided with a radially inner surface 23 which engages the radially outer surface of the annular bags 13. The depending legs 21 terminate in a flange 24 about which is resiliently held an annularly continuous helical spring 25 which urges the elements 20 radially inwardly. In the unexpanded position as shown in FIG. 2 the flange 24 of each of the elements 20 engages a flange 26 on the members 27, one of which is positioned at each end of the spider 14 through 14b by means of suitable bolts. As shown in FIG. 16 the flanges 24 engage an annular flange 29 provided on the members 27 when the drum is in a radially expanded position. As shown in FIG. 2, the shaft 2 is provided with a rotatable coupling 30 to which is fixed an air hose 31 which communicates with the hole 32 in the shaft 2 extending from the coupling 30 to the outer end 33 of the shaft. As shown in FIG. 2 a plurality of radially extending holes 34 communicate with the hole 32 and with each of the annular bladders 13 through the holes 35a and 35b. The spiders 14 through 14b are provided with O-rings 36, 36a and 36b which insure that there is airtight communication between holes 34 and 35 and likewise permit the spiders 14 and 14b to be moved axially relative to the spider 14a. It is thus seen that as air pressure is admitted to the annular bladders 13 the bladders expand into toric shape as shown in FIG. 16 and each of the elements 20 are moved radially outwardly against the pressure of springs 25 until the flanges 24 engage the flanges 29 on the elements 27. In expanded position the elements 20 provide a substantially rigid cylindrical working surface. When the air pressure in the bladders 13 is released the elements 20 are returned to their radially inward position as shown in FIG. 1 by the springs 25.

Figures 7, 8:
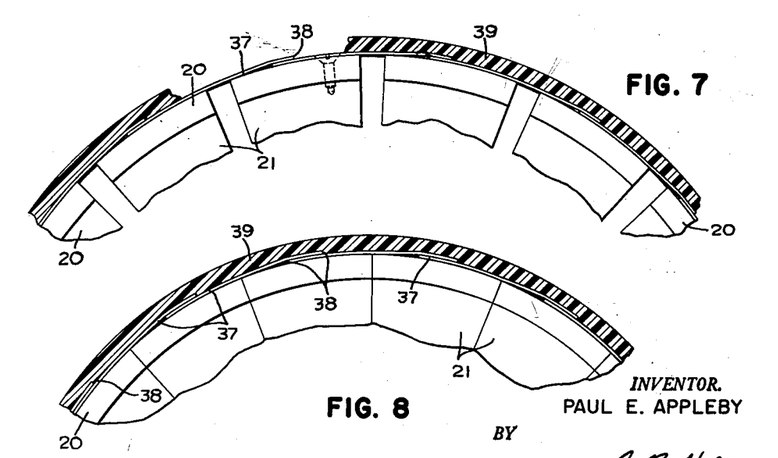
FIG. 7 is an enlarged partial sectional view similar to FIG. 6 showing the drum in expanded position.
FIG. 8 is a view similar to FIG. 7 showing the drum in unexpanded position.

As shown in FIGS. 7 and 8 each of the elements 20 is provided with thin metal arcuate shaped cover plates 37 suitably secured thereto and which are coextensive with the complete length of the elements 20. The plates 37 extend circumferentially and beyond the elements 20 into overlapping engagement with adjacent plates, as shown in FIG. 7, and such overlapping relationship is maintained from the expanded to the unexpanded position of the drum as shown in FIG. 8. The plates 37 on the elements 20 secured to the fixed spider 14a extend axially therebeyond into an axial overlapping relationship with the plates 37 on spiders 14 and 14b. Since the plates 37 overlap each other in all radial or axial expanded positions of the drum, it is seen that the plates 37 bridge the axially and/or the circumferentially extending gaps which exist between the elements 20 when the drum is expanded.

It is seen that the plates 37 provide a radial and circumferentially continuous rigid work surface on the drum and in order to eliminate any bridging of the tire fabric across the edges 38 of the plates 37, a cylindrical flexible stretchable resilient cover 39 completely encloses the elements 37 as shown in FIG. 2. The cover 39 is provided with radially inwardly extending flanges 40 which terminate in an annular bead 41. The bead 41 is clamped between the member 27 and an annular plate 28 at each end of the drum 1 and a substantial radial distance inwardly from the work surface of the drum.

Figure 6:
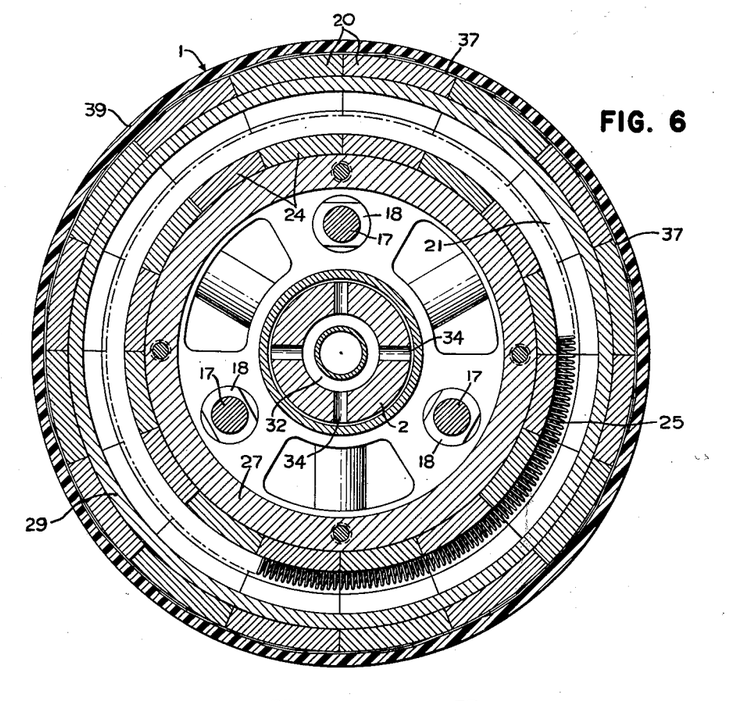
FIG. 6 is an enlarged sectional view taken along the lines 6—6 of FIG. 2.

As previously indicated, the drum can be adjusted axially so as to accommodate tires of different sizes by rotating the shaft 17 so as to move the spider 14 and 14b relative to the spider 14a. As shown in FIG. 6 a plurality of screw shafts 17 are provided which are spaced equidistant from each other and in concentric relationship about the axis of the shaft 2. Each of the screw threads 17 is supported and actuated in like manner and they are connected to each other by means of an annular ring gear 42 which engages a pinion gear 43 secured to each of the shafts 17 so that rotation of any one shaft 17 actuates all of the shafts 17 and in turn all of the shafts 17 exert a uniform and constant force on the spiders 14 and 14b to move them axially relative to the spider 14a.

Figure 4:
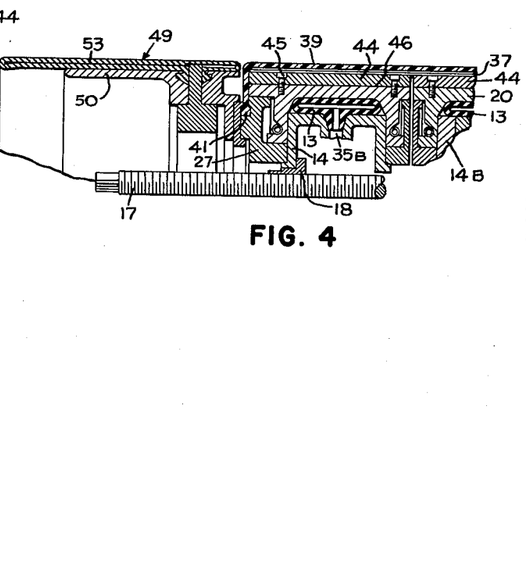
FIG. 4 is a fragmentary view similar to FIG. 2 showing the drum adjusted to a greater minimum diameter than that shown in FIG. 2.
Figure 5:
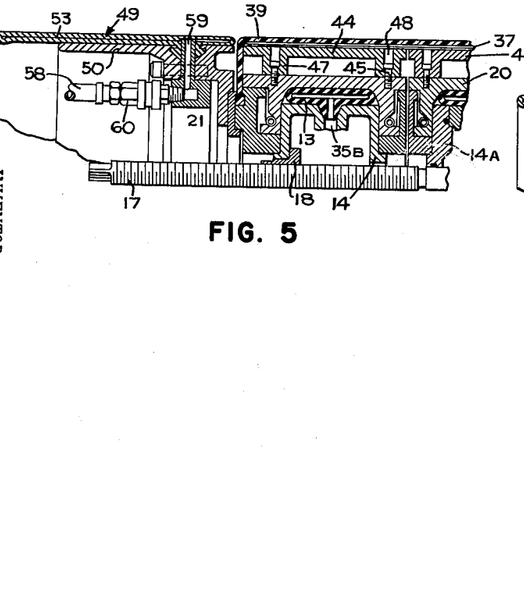
FIG. 5 is a fragmentary view similar to FIG. 4 showing the drum adjusted to a still greater minimum diameter.

In order that the drum may accommodate tires of a range of diameters, each of the elements 20 of the drum is provided with a plurality of spacer elements 44 secured to the radially outer surface of the elements 20 by bolts 45 as shown in FIG. 4. The spacers 44 have a radially inner surface 46 which is contoured to the shape of the radially outer surface of each of the elements 20 and is co-extensive therewith. The overlapping plates 37 are secured to the spacer elements 44 and the cover 39 is positioned over the plates 37 as shown in FIG. 7 so that the drum can accommodate, for example, 15" bead diameter tires. In FIG. 5 spacer elements 44 are provided having legs 47 which bear against each of the elements 20 and as secured thereto by screws 45 which are positioned within the counter sunk holes 48 in the elements 44 so that the diameter of the drum in unexpanded position is increased over that shown in FIG. 4 to accommodate tires, for example, of 16" bead diameter.

Figure 3:
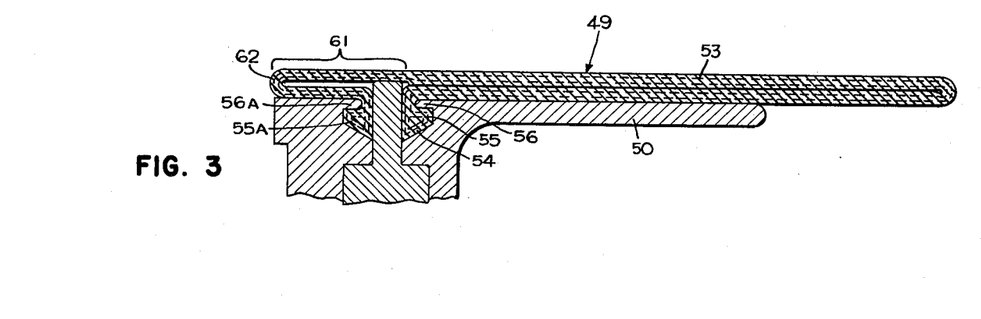
FIG. 3 is an enlarged sectional view of the flexible inflatable ply turn-up means.

As shown in FIG. 2 a ply turn-up device 49 is secured to each end of the drum which comprises a rigid cylindrical support 50 having a radially depending flange 51. The axial face of flange 51 engages the annular ring 28. A plurality of bolts 52 secures the cylindrical member 50 directly to the annular member 27 of the drum. An annular inflatable flexible bag 53 is mounted on the member 50 and in uninflated position the bag 53 has an outer diameter substantially the same as the outer diameter of the drum 1 in unexpanded position. As shown in FIG. 3, the bag 53 is provided with an annular radially extending circumferentially continuous portion 54 which in cross-section is provided with flanges 55 and 55a engaged by the flange 56 and 56a of the member 50. A hose 31 is connected to the coupling 30 and communicates with a longitudinal opening in the shaft 2 extending from the coupling 30 to the end member 33, as shown in FIG. 1. A plurality of hoses 58 are connected to the member 33 and communicate with the orifices 59 on the bag 53 by means of a quick releasable coupling 60. The orifices 59 extend through the portion 54 and communicate with the interior of the bag 53.

For reasons which will be more fully explained hereinafter, the inboard portion 61 of the bag 53, that is the portion of the bag 53 as shown in FIG. 3 which extends from the surface 62 axially to a position just beyond the orifice 59, is made of material which is more flexible than the outboard or remaining portion of the bag. The bag 53 is flat when uninflated and is inflatable into a toric shape. Preferably, the bag 53 is made of elastomeric material such as rubber and is reinforced with two plies of textile cords extending on a bias relative to the circumference of the bag 53 and preferably including two such reinforcing plies which extend at cross angles relative to each other. The bias angle of the cords is such that when the bag is inflated it will be maintained by such cords in a substantially elliptical shape.

Figure 9:
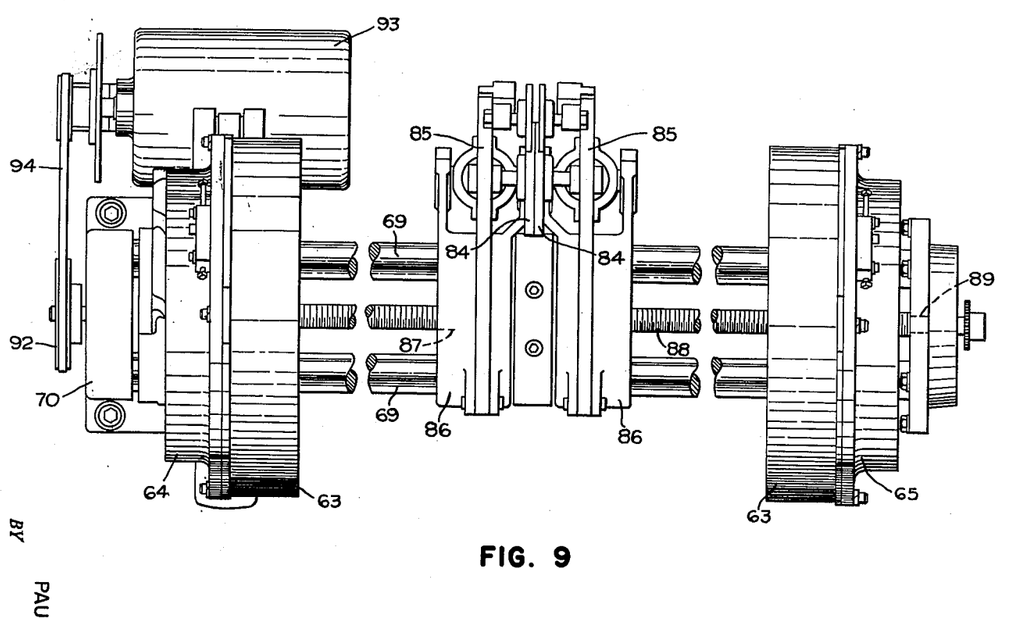
FIG. 9 is a fragmentary longitudinal view with parts broken away and parts shown in section showing the support and drive means for the bead setters and face stitchers.

The plies are turned around the beads by means of ply turn-up devices 49 by rolling the bladders 53 thereof upon themselves as shown in FIGS. 17 through 22. Such movement or rolling of the bladders is accomplished by a combination restricting and pushing member 63 mounted respectively on a support 64 and 65 which are secured to carriages 66 and 66a at each end of the drum 1. The carriages 66 and 66a are movable axially to and fro relative to the drum 1. Referring to FIGS. 1 and 9, the carriages 66 and 66a are provided with a base 67 having a pair of ears 68 which are suitably bored and through which slide bars 69 project. The bars 69 extend from the frame member 6 at the inboard end of the drum 1 to a pedestal 70 at the outboard end of the drum which is secured to the frame 7 of the machine. The carriage 66 is moved by means of an air cylinder 71 having a piston rod 72 connected to the carriage 66 by depending fingers 73. Likewise, the carriage 66a is moved along the slide bars 69 by means of a cylinder 74 similarly connected to the carriage 66a by piston rod 75. Each of the cylinders 71 and 74 are simultaneously supplied by air pressure from a common source so that carriages 66 and 66a move simultaneously and at a uniform speed to and from the respective ends of the drum, as will be described more in detail hereinafter.

Figure 14:
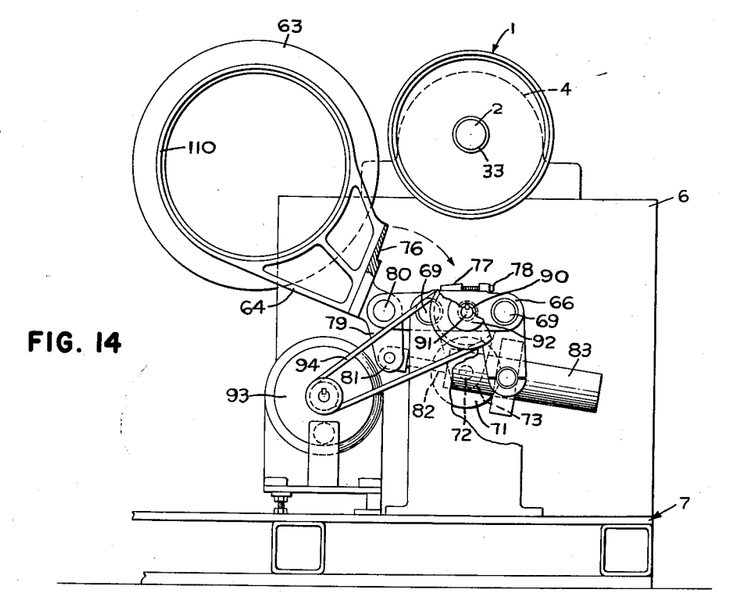
FIG. 14 is an end view of the machine with parts broken away.

In order to permit removal of the tire carcass after building thereof, the restricting member 63 mounted on the carriage 66 at the outboard side of the drum is pivotably mounted on the carriage 66 as seen in FIG. 14. The support 64 terminates in a machined surface 76 which in normal operative position engages a base plate 77 mounted on carriage 66. Preferably, the surfaces 76 and 77 are inclined and the surface 77 is adjustable by a suitable screw 78 so that the axis of the member 64 can be adjusted to coincide exactly with the axis of the drum 1. A depending lug 79 extends from the support 64 and is pivotably mounted on a pin 80. The end 81 of the lug 79 is connected to the piston rod 82 of the actuating cylinder 83 which pivots the support 64 about the pin 80 from the position shown in FIG. 9 to the position shown in FIG. 14 so that the tire can be removed from the drum 1.

Also mounted for slidable movement on the slide bar 69 is a pair of face stitchers 84 rotatably mounted on arms 85 pivotally connected to each stitcher carriage 86. The carriages 86 are suitably bored so that they may be reciprocated along the bars 69. As shown in FIG. 9, each of the carriages 86 is provided with a threaded bore 87 which engages a driven thread screw 88 having oppositely directed threads at each end thereof. The screw 88 extends through the carriages 66 and is suitably journaled as at 89 and 90. The outboard end 91 of the screw 88 is provided with a pulley 92 and driven by motor 93 through a suitable belt 94. It is seen that as the screw 88 is rotated the carriages 86 are positively moved axially of the drum so as to stitch the face of the fabric.

Figure 10:
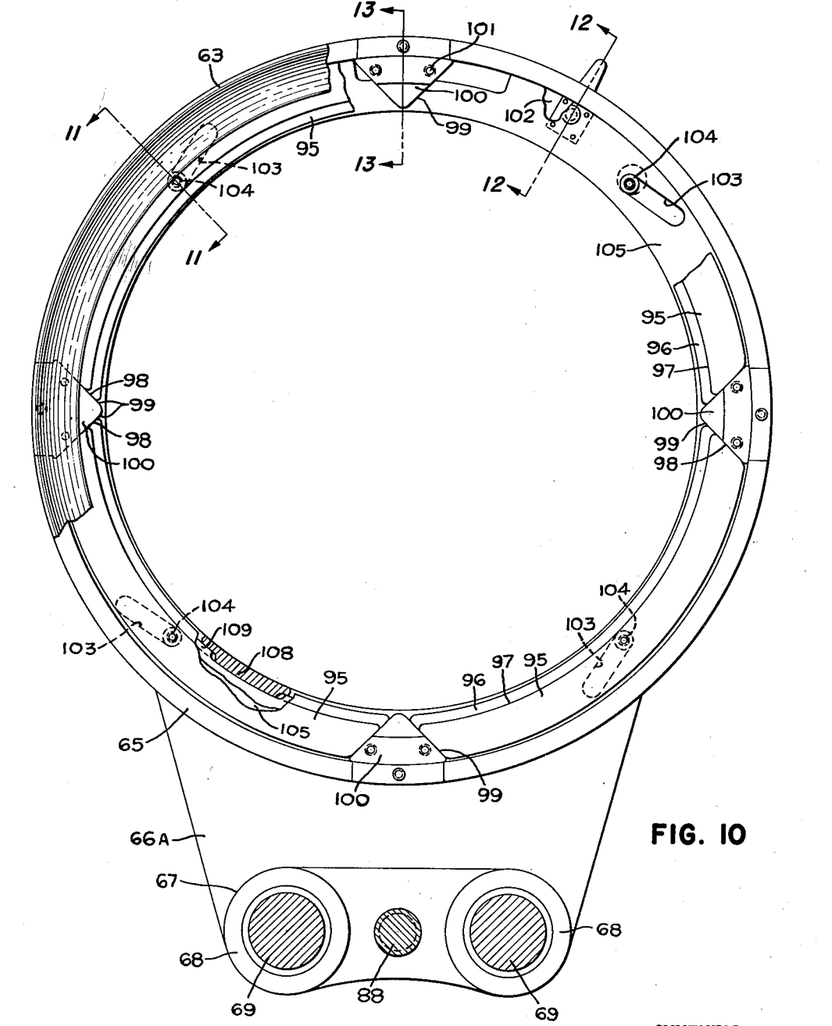
FIG. 10 is an end view of the bead setter and restrictor for the turn-up bladder with parts broken away.
Figures 11, 12, 13:
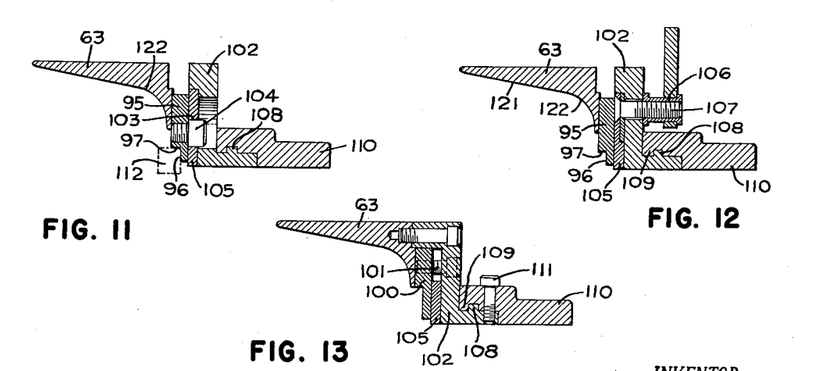
FIGS. 11, 12 and 13 are sectional views taken respectively along the lines 11—11, 12—12 and 13—13 of FIG. 10.

Each of the carriages 66 support not only the restricting and pushing member 63 but also a plurality of radially adjustable bead holding elements 95 as shown in FIGURES 10 through 13. Each of the elements 95 has a surface 96 which engages the radially outer periphery of the bead and a surface 97 which engages the axially outer surface of the bead. As shown in FIG. 10, the elements 95 have inclined ends 98 which bear against corresponding inclined surfaces 99 of the members 100 which are secured by the bolt 101 to the lock plate 102. The ring 105 has an elongated slot 103, the axis of which is located tangentially to a radius of the lock plate 102 and a pin 104 secured to the ring 105 extends into the slots 103. The ring 105 may be manually rotated a limited distance to move the pin 104 relative to the slot 103 and thereby adjustably position each of the elements 95 radially of the lock plate 102 so that the surfaces 96 and 97 are correspondingly radially adjusted to accommodate beads of various diameters. As shown in FIG. 12, after the rings 95 have been adjusted to a given diameter the nut 106 may be tightened upon the bolt 107 to thereby lock the rings 105 in their circumferentially adjusted position. The lock plate 102 is provided with a plurality of spaced radially extending lugs 108 which extend behind a plurality of similarly spaced lugs 109 on the base plate 110 and which together comprise a bayonet type lock. By moving the lock plate 102 axially through the intervening openings between the lugs 109 and rotating the lock plate 102 circumferentially until the lugs 108 underlie the lugs 109, the lock plate 102 is removably secured to the base plate 110. A bolt 111 is then inserted into aligned holes in the base plate 110 and lock plate 102 as shown in FIG. 13 to lock the plates together. It is thus seen that the lock plate 102, which carries the adjustable bead holding elements 95 as well as the restricting and pushing member 63, may be easily removed from the carriage 66 and another assembly, having a lock plate similar to lock plate 102 but with bead holding elements and a restricting and pushing member of a different size, may be mounted thereon to accommodate beads of diameters which cannot be accommodated within the limits of the minor adjustment of the elements 95 heretofore described.

With the machine elements in the position shown in FIG. 1, the operation of the machine is as hereinafter described. The operator places a bead ring 112 into engagement with the surfaces 96 and 97 of the bead holders 95 and manually rotates the ring 105 until the bead rings fit snugly in the elements 95. Thereafter, the nut 106 is tightened to lock the ring 105 in place. All tires subsequently built with the same size bead ring the beads will fit the elements 95 snugly and no further adjustment need be made until a different size tire is to be built on the machine.

Figure 15:
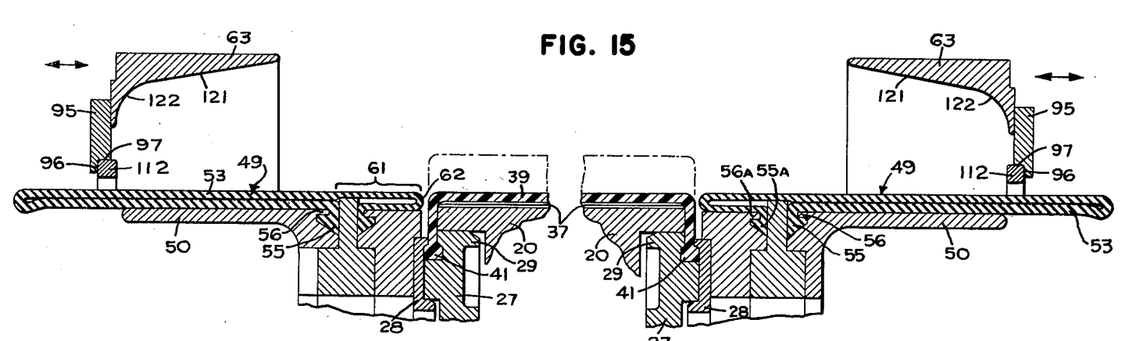
FIG. 15 is a partial longitudinal sectional view of the drum and ply turn-up means and bead setter showing the relative relationship thereof prior to expansion of the drum.

With the beads in place as described above, the layers or plies 113 of rubberized tire fabric are placed around the drum with bias cuts in each layer opposed or crossing each other. The fabric usually consists of cotton, rayon or nylon cord impregnated with rubber compound so that it is sticky or tacky and each layer sticks readily to the adjacent one. The layers or plies of rubberized tire fabric are positioned on the drum so that the endings 114 extend beyond the shoulder 115 of the drum and overlie the bladder or bags 53 as shown in FIG. 15 of the drawings. Air is then admitted into the bags 13 so as to expand the elements 20 until the flange 24 engages the flange 29 to hold the elements in a fixed radially expanded position. By expanding the drum after the fabric layers have been located thereon, the fabric layers are stretched and wrapped or forced together to eliminate any bumps, ridges or air pockets and to form a shoulder 116 in the plies as shown in FIG. 17 of the drawings.

After the fabric layers have been placed around the drum, and the drum expanded, the beads 112 must be placed against the shoulder 116 formed in the fabric. Air is admitted to the cylinders 71 and 74 simultaneously and the carriages 66 and 66a are moved axially towards the center of the drum until the beads 112 are butted against the shoulder 116 of the fabric as shown in FIG. 17. This operation formally stitches the lateral face 117 of the bead 112 against the axially outer face of the shoulder 116. Because the entire surface including the shoulders of the drum are covered with the yieldable cover 39 which bridges any gaps formed by the overlapping elements 37, the plies 113 are firmly stitched together across the entire face thereof and at the shoulder 116 eliminating any trapped air between the plies and between the laminated plies and the cover 39.

Figure 17:
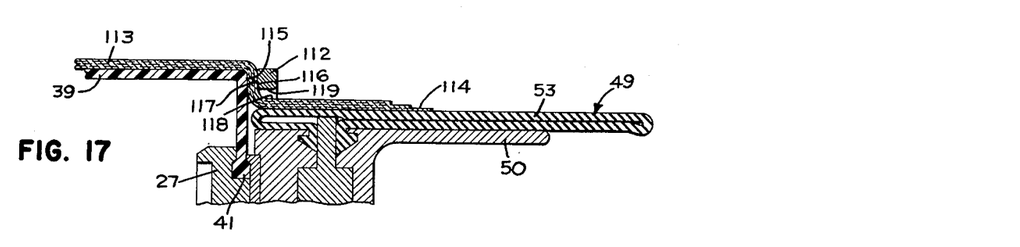
FIG. 17 is a view similar to FIG. 15 showing the drum in expanded position and with the bead ring setter in its axially innermost position.
Figure 18:
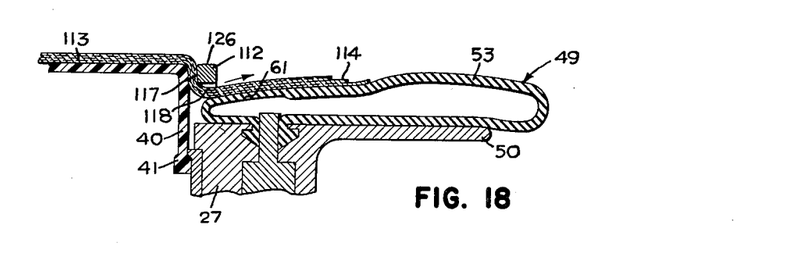
FIG. 18 is a view similar to FIG. 17 with a ply turn-up bladder in an initial partially inflated position.
Figure 19:
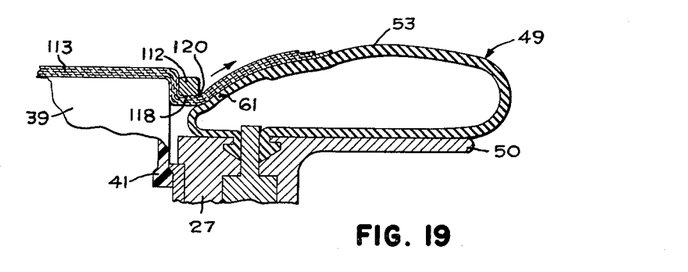
FIG. 19 is a view similar to FIG. 18 with the ply turn-up bladder more fully inflated.
Figure 20:
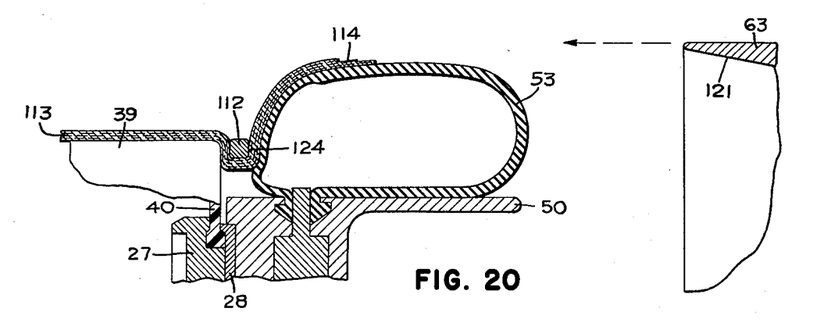
FIG. 20 is a view similar to FIG. 19 with a ply turn-up bladder fully inflated.
Figure 21:
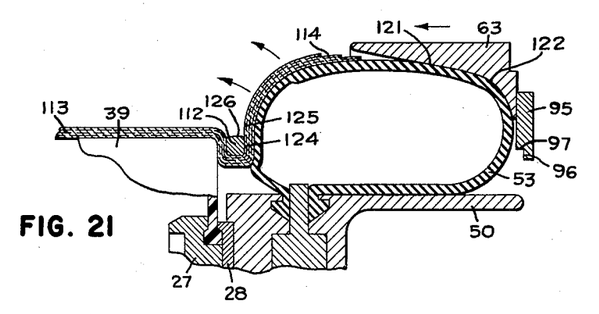
FIG. 21 is a view similar to FIG. 20 with the cage initially engaging the ply turn-up bladder.
Figure 22:
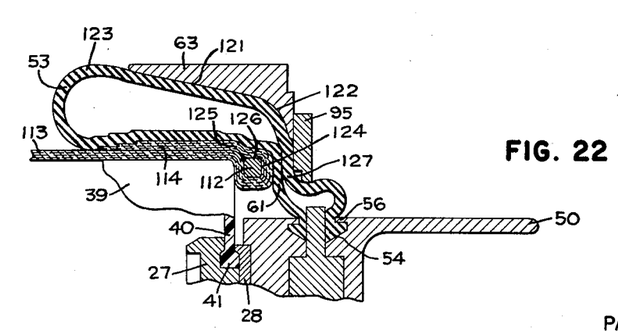
FIG. 22 is a view similar to FIG. 21 with the cage in its axially innermost position.

With the fabric end portions 114 extending axially of the drum and overlying the turn-up bladder 53 approximately half of the length thereof, as shown in FIG. 17, air is admitted to the orifices 59 and inflation of the bags 53 is simultaneously initiated. Since the inboard end 62 of the bags 53 is substantially thinner than the thickness of the remaining portion thereof, and therefore more flexible, the initial inflation of the turn-up bags 53 causes the portion 61 to move axially away from the center of the drum 1 in the direction of the arrow shown in FIG. 18. The initial inflation actually causes the bags 53 to decrease in sectional length, as the bags are inflated but; the flexible inboard portion 61 moves substantially more rapidly towards the center of the bags 53 as it is moved simultaneously radially outward. This action of the bags 53 places a tension on the ply endings 114, and in fact, the plies are tensioned or pulled away from the center of the drum, as the ply endings 114 are expanded from the position shown in FIG. 17 to the position shown in FIG. 19. During this radial expansion the frictional forces between the ply endings 114 and the bags 53 are substantially increased as is the axial force applied to the endings 114. Therefore, the portion 118 of the ply ending underlying the base 119 of the bead ring 112 is stitched to the base 119 as shown in FIG. 19 with a substantial simultaneous and uniform tension applied thereto. The stitching of the portion 118 of the plies occurs simultaneously and uniformly throughout the entire circumference of the ply ending and simultaneously across the base 119 of both bead rings 112.

As the turn-up bags 53 continue to inflate up to a pressure of approximately 16 p.s.i., the bags reach a state of equilibrium. That is, the inflating pressure expands the bags to the shape shown in FIG. 20 wherein the bias cords in the bags have reached a point of equilibrium with the expansion force. The portion 62 of the bag is snubbed under the corner 120 of the bead and the bag has assumed a substantially bulbous shape having a maximum diameter slightly less than the maximum inner diameter of surface 121 of the restraining and pushing members 63.

After the bladders have been fully inflated, the cylinders 71 and 74 are again actuated so that the carriages 66 and 66a move simultaneously towards the center of the drum. The radially inner surface 121 of the restraining member 63 is slightly conical in shape with a radius decreasing and coextensively formed with the radially extending lateral surface 122. The outer surface of the bag 53 outboard of the ply ending 114 is engaged by the surfaces 121 and 122 as the member 63 is moved axially in the direction shown by the arrow in FIG. 21 and the bag 53 bulges radially outward in front of the member 63. The portion 123 of the bag 53 is thereby formed with a radius of curvature which decreases as the member 63 pushes the bag 53 axially. The portion 123 is therefore freely rolled against the axially outer facing surface 124 of the bead with a considerable tension being applied to the fabric ending 114 so that the ending 114 is stitched against the face 124 with considerable pressure. As the restraining member 63 continues in its axial movement towards the center of the drum 1, the marginal edge 125 thereof is continuously and uniformly rolled and stitched against the radially outer surface 126 of the bead and across the shoulder and end portion of the drum into overlapping engagement with the underlying ply material. In the axially innermost position of the carriages 66 and 66a the surfaces 97 of the bead holders 95 engage with portion 127 of the bladder and are butted against the face 124 of the bead ring 112 so that an additional stitching pressure is applied against the ply portion lying across the face 124 of the bead ring.

The carriages 66 and 66a are then retracted simultaneously away from the center of the drum to the position shown in FIG. 1 and the bags 53 are deflated. The tire tread is then wrapped around the ply layers and the face stitchers 84 are then moved from their central position shown in FIG. 1 by energizing the motor 93 so as to move the stitchers 84 simultaneously and uniformly towards the shoulders of the drum 1 as the drum is rotated. After thus stitching the tread of the tire, the cylinder 83 is actuated so as to move the support 64 into the position shown in FIG. 14. The tire may then be removed from the machine after the drum 1 has been collapsed.

Those skilled in the art may readily provide suitable controls for effecting operation of the air cylinders 74, 71 and 83, as well as the motors 8 and 93 in the desired sequence and timed relation. Therefore, no such control elements have been herein illustrated or described. Switches and timers may be provided where necessary to control the motors and limit switches or the like to admit or vent air under pressure from within the bladders 13 of the drum or the turn-up bladders 53. These controls are within the realm of selection by the skilled mechanic and no invention is seen in using any of the variety of forms thereof which may be employed to accomplish the desired function in the proper sequence and in the desired time relation.

While certain representative embodiments and details have been shown for the purpose of illustrating the invention, it will be apparent to those skilled in this art that various changes and modifications may be made therein without departing from the spirit or scope of the invention.

I claim:

1. In a tire building machine, a rotatable building drum having a plurality of elements which are expandable from a radially inner to a radially outer position and which collectively define a substantially cylindrical surface, an annular support at each end of the drum, an annular inflatable bag for turning up the ply endings mounted on each of said supports, means for annularly securing each bag to one of said supports at a location spaced axially from the ends of said bag, the portion of said bag adjacent said drum inboard of said bag securing means having substantially greater stretchability than the remaining portion of the bag so that when the bag is inflated the bag moves initially axially away from said drum.

2. A tire building machine as claimed in claim 1 in which the said portion of the bag adjacent said drum is of substantially thinner cross section than the remaining portion of said bag.

3. A tire building machine as claimed in claim 1 in which an annular member is positioned outboard of and concentric with said bags for moving each of said bags towards the center of the drum and means for moving said annular member simultaneously towards the center of the drum after said bags are inflated.

4. A tire building machine as claimed in claim 1 in which said bags have a length substantially less than one-half the length of the drum, an annular member for moving each bag towards the center of said drum, said bag moving members each have an axial length substantially less than one-half the length of said bladders.

5. A tire building machine as claimed in claim 1 having an annular member for moving each bag towards the center of said drum, said annular members each being provided with a surface engaging a portion of the radially facing surface of the bag and a surface engaging the axially facing surface of the inflated bag.

6. In a tire building machine, a radially and axially expandable drum mounted on a shaft, comprising a plurality of expandable sections coaxially arranged on said shaft, each section having a multiplicity of radially movable elements collectively defining a substantially cylindrical surface, means for simultaneously moving the elements radially in order to expand the drum to a greater diameter, each of said elements on each of said sections being provided with spacer members having a radially inner surface coextensive with the outer surface of said elements and a radially outer surface which collectively defines a cylindrical surface, a plurality of cover plates secured to and bridging said spacer members and means for removably securing said spacer members to each of said elements, whereby the diameter of the drum in its unexpanded position may be changed without removing the elements from the machine.

7. In a tire building machine, a rotatable drum having a plurality of elements which are expandable from a radially inner to a radially outer position and which collectively define a substantially cylindrical surface upon which tire plies are laid, an annular rigid support positioned at each end of the drum, an annular inflatable tube mounted on each of said supports for turning up the ply endings which covers said drum and an adjacent portion of each tube, a pair of tube pushing members which are axially movable, respectively, into engagement with each of said tubes after said tubes are inflated, each tube pushing member being movable toward the center of the drum and into contact only with the uncovered portion of each tube which extends axially beyond each edge of the plies, and actuating means for advancing and retracting said pair of tube pushing members during the same time interval toward and away from the center of the drum whereby said pushing members are moved into engagement with said inflated tubes to move said tubes and the ply endings over the ends of said drum.

8. In a tire building machine, a rotatable drum having a plurality of elements which are expandable from a radially inner to a radially outer position and which collectively define a substantially cylindrical surface upon which tires plies are wrapped, an annular rigid support positioned at each end of the drum, an annular inflatable tube mounted on each of said supports for turning up the ply endings which extend around the portion of each tube adjacent the drum, means to inflate each of said tubes, a pair of tube pushing members each provided with a surface directly engaging a portion of the radially facing surface of said tube and a surface directly engaging a portion of the axially facing surface of said tube after the tubes are inflated, and means for moving each of said tube pushing members toward the center of the drum into engagement with the portion of each of said inflated tubes which extends axially beyond each edge of the plies.

9. In a tire building machine, a rotatable drum having a plurality of elements which are expandable from a radially inner to a radially outer position and which collectively define a substantially cylindrical surface upon which tire plies are wrapped, an annular rigid support positioned at each end of the drum, an annular inflatable tube mounted on each of said supports for turning up the ply endings which extend around the portion of each tube adjacent the drum, means to inflate each of said tubes, a pair of tube moving members each directly engaging, respectively, the portion of each of said tubes which extends axially beyond the edge of the plies, the axial length of each tube moving member being less than one-half the length of said tubes when uninflated, and means for moving said tube moving members simultaneously toward the center of the drum into engagement with said inflated tubes to thereby move said tubes over the end of said drum.

10. A tire building machine, a rotatable drum having a plurality of elements which are expandable from a radially inner to a radially outer position and which collectively define a substantially cylindrical surface upon which tire plies are wrapped, an annular rigid support positioned at each end of the drum, an annular inflatable tube mounted on each of said supports for turning up the ply endings which extend around the portion of each tube adjacent the drum, each tube having an uninflated length less than the length of said drum, a pair of tube moving members each engaging, respectively, the portion of each of said tubes which extends axially beyond the edge of the plies, and means for moving said tube moving members simultaneously toward the center of the drum into engagement with said inflated tubes to thereby move said tubes over the end of said drum.

11. In a tire building machine, a rotatable drum having a plurality of elements which are expandable from a radially inner to a radially outer position and which collectively define a substantially cylindrical surface, an annular rigid support positioned at each end of the drum, an annular inflatable tube for turning up the ply endings mounted on each of said supports, means to inflate each of said tubes, a pair of tube moving members each having a surface engaging, respectively, one of said tubes when said tubes are inflated, a carriage for each of said members for moving said members toward the center of the drum, a bead ring holder mounted at the axially outer end of each of said surfaces of the tube moving members, and means to move the carriage toward and away from said drum while the tubes are uninflated to thereby set the bead rings.

12. A method of building a tire carcass comprising forming an annular band of at least one ply of rubber-coated reinforcing material, said band having a cylindrical central portion, radially inwardly extending portions forming a shoulder, and cylindrical end portions of lesser diameter than said cylindrical central portion; applying a bead ring against each shoulder portion with the cylindrical end portions of said band extending coaxially with and radially inwardly spaced from the radially inner periphery of the bead rings to thereby provide a spacing between the inner periphery of the bead rings and the entire axial length of said end portions; frictionally engaging only the radially inner surface of the end portions simultaneously around the entire circumference and the entire axial length thereof and initially radially expanding said end portions; pulling said end portions axially away from the central portion of said band prior to contact of the end portions with the radially inner periphery of the bead ring; thereafter, radially expanding the end portions to a still greater diameter while axially pulling said end portions so that the end portions tightly engage the inner periphery of the bead rings while being pulled axially around the entire circumference thereof; and thereafter, progressively folding and stitching said end portions around the axially and radially outer facing surfaces of the bead rings.

13. A method of building a tire carcass as claimed in claim 12 in which said annular band is formed by wrapping said ply of reinforcing material around a tire building drum with the end portions of the fabric extending beyond the shoulders of the drum and positioned over annular inflatable members arranged coaxially on opposite ends of said tire building drum; the shoulder portions and cylindrical end portions being formed by radially expanding the drum; and subsequently, after the bead rings are applied against the said shoulder portions, the entire axial length of the end portions of said ply are frictionally engaged only at the radially inner surface thereof and simultaneously around the entire circumference thereof by expanding said inflatable members; and then, said inflatable members, as well as the end portions of said ply frictionally engaged by said members, are moved axially away from said drum so as to axially tension said end portions prior to contact of said end portion with the radially inner periphery of the bead ring; and thereafter simultaneously radially expanding said inflatable members, as well as said end portions of said fabric, to a still greater diameter so that the end portions tightly engage the base of the bead rings around the entire circumference thereof; and thereafter further radially expanding said inflatable members and moving said inflatable members axially toward the center of the drum to progressively fold and stitch said end portions around the axially and radially outer facing surfaces of the bead rings.

References Cited in the file of this patent

UNITED STATES PATENTS

| | | |
|---|---|---|
| 2,605,198 | Haase | July 29, 1952 |
| 2,614,952 | Kraft | Oct. 21, 1952 |
| 2,715,932 | Frazier | Aug. 23, 1955 |
| 2,814,330 | Vanzo | Nov. 26, 1957 |
| 2,986,196 | Frazier | May 20, 1961 |

FOREIGN PATENTS

| | | |
|---|---|---|
| 175,754 | Great Britain | Feb. 20, 1922 |